United States Patent [19]

Posner et al.

[11] Patent Number: 4,807,280
[45] Date of Patent: Feb. 21, 1989

[54] CROSS-CONNECT SWITCH

[75] Inventors: Edward C. Posner; Patrick Smyth, both of Pasadena, Calif.

[73] Assignee: Pacific Bell, San Francisco, Calif.

[21] Appl. No.: 98,519

[22] Filed: Sep. 18, 1987

[51] Int. Cl.$^4$ .............................................. H04Q 3/42
[52] U.S. Cl. ...................................... 379/272; 340/826
[58] Field of Search .............. 379/327, 326, 273, 272, 379/271; 340/826, 827

[56] References Cited

U.S. PATENT DOCUMENTS

| | | | |
|---|---|---|---|
| 3,291,914 | 12/1966 | Bowers | 379/306 |
| 3,593,295 | 7/1971 | Joel, Jr. | 379/272 X |
| 3,763,325 | 10/1973 | Kopel et al. | 379/327 |
| 3,920,923 | 11/1975 | Schönemeyer | 340/825.8 |
| 3,978,291 | 8/1976 | Bergeron, Jr. et al. | 379/16 |
| 4,038,638 | 7/1977 | Hwaug | 379/272 X |
| 4,566,007 | 1/1986 | Richards | 340/825.8 |

Primary Examiner—Thomas W. Brown
Attorney, Agent, or Firm—Fitch, Even, Tabin & Flannery

[57] ABSTRACT

A cross-connect switch having different numbers of input and output lines is described. The switch is constructed from an odd number of stages. Each stage is constructed from a plurality of switch modules. Embodiments which require at most two different types of switch modules are described. Other embodiments which utilize at most two different types of switch modules are also described.

13 Claims, 11 Drawing Sheets

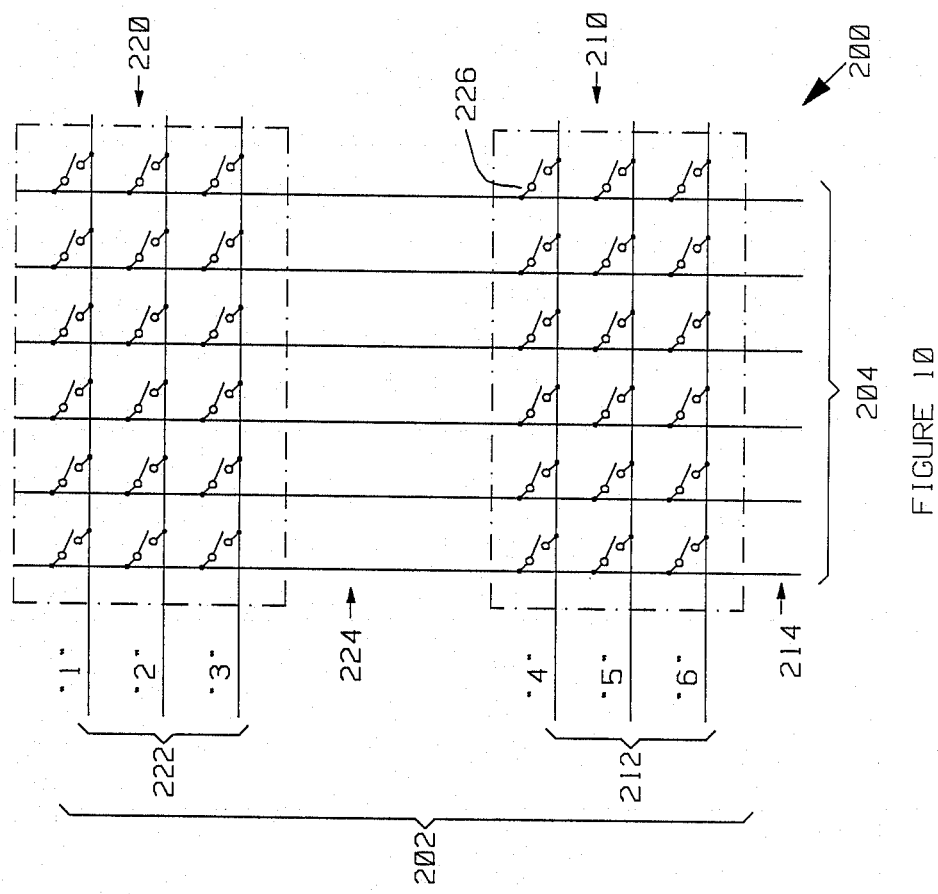

CROSS-CONNECT SWITCH

BACKGROUND OF THE INVENTION

The present invention relates to the field of cross-connect switches and more particularly to a cross-connect switch for automating the functions of a main distribution frame in a telephone system.

In a typical telephone system, each subscriber's telephone is connected to a central office by a subscriber loop consisting of two metallic conductors which, for historical reasons, are referred to as "tip" and "ring". The subscriber loops are organized into cables which are routed past the premises of potential subscribers. In each central office, the subscriber loops serviced by that office terminate on the main distribution frame.

The main distribution frame is used to make assignments between the subscriber loops and the central office switch input lines. The subscriber loops are connected to terminals on one side of the main distribution frame, and the input lines to the central office switch are connected to terminals on the other side of the main distribution frame. Assignments are made by manually connecting the tip and ring conductors of a subscriber loop to the tip and ring conductors of the desired input line using two metallic conductors. Hence, the main distribution frame represents a cross-connect field which grows in complexity as new subscriber loops are connected to the central office switch. As the complexity of this cross-connect field increases, the maintenance costs associated with it also increase; hence, automation of this function is desirable.

In spite of numerous improvements in telephone switching, the main distribution frame has remained essentially as described above for over 50 years. The reasons for this lie in certain advantages bestowed by this simple structure. First, any subscriber loop can be connected to any central office switch input line. Second, the main distribution frame provides a convenient point for making physical connections to any of the subscriber loops for the purpose of testing the loops. Finally, the capital investment in the main distribution frame is relatively small compared with the alternative systems devised over the years.

There have been a number of systems proposed for automating the functions of the main distribution frame. Joel, Jr. (U.S. Pat. No. 3,562,435) teaches a cross-connect switch for this function. However, the cost of this system has been too great for it to be practical.

Kapel, et al. (U.S. Pat. No. 3,763,325) also teach a cross-connect switch for automating the main distribution frame functions which reduces the cost of cross-connect switch by using a cross-connect switch consisting of a number of terminal strips which are manually wired by crafts people in response to instructions generated by data processing computers which are not a part of the invention in question. The manual labor required to make the connections in this switch make the switch unattractive for automating the main distribution frame functions.

Bergeron, Jr., et al. (U.S. Pat. No. 3,978,291) describe a cross-connect switch for automating the main distribution frame functions which employs a switch module in which connections are made by physically placing pins into circuit boards. The operation of pin placement is carried out by robotics. This system may be viewed as that of Kapel, et al. with the manual circuit wiring having been replaced by an automated system. This system has also not found wide spread use because of the costs associated with it.

Each of the above mentioned cross-connect switches has the same number of output lines as input lines. Such designs are poorly suited for automating a main distribution frame. In general, only a fraction of the subscriber loops terminating in the central office are in use at any given time. The remaining subscriber loops represent subscriber loops which were connected to a subscriber who has terminated service or subscriber loops which are spares that have not yet been connected to any subscriber's premises. As a result, there are more subscriber loops in place than central office switch inputs to service subscriber loops. Hence, a cross-connect switch for automating the main distribution frame function should have significantly more output lines for connection to subscriber loops than input lines for connection to the central office switch. The above mentioned prior art cross-connect switches consisted of cross-connect switches having one input line for each subscriber loop. In these cross-connect switches the number of lines must be chosen to be the maximum number of subscriber loops which are connected to the central office. As a result, the cross-connect switches have many more inputs for connection to the central office switch than there are central office switch lines. These excess inputs and the switch or cross points needed to implement them substantially increase the cost of the cross-connect switches.

In the case of the system taught by Bergeron, et al. the number of input and output lines are further restricted. Bergeron, et al. teach a cross-connect switch in which the number of input lines must be equal to $K^3$ where K is an integer. If the desired number of subscriber loops is not equal to the cube of an integer, one must build an even bigger cross-connect switch. That is, one must build a switch with $K^3$ inputs where K is chosen such that $K^3$ is greater than the desired number of lines and $(K-1)^3$ is less than the desired number of lines. This restriction, in general, further increases the cost of the cross-connect switch, since it requires that further unneeded capacity be included in the switch whenever the optimum number of lines is not equal to the cube of an integer.

A second problem with these prior art designs relates to the size of the basic switch module used to construct the cross-connect switches in question. In general, a cross-connect switch consists of a number of stages. Each stage is constructed from a plurality of switch modules. Each switch module has a plurality of input and output lines. Each switch module is constructed from a number of switch points, commonly referred to as cross-points, which allow the module to be used to connect any of its input lines to any of its output lines, provided the input and output lines in question are not already connected.

In general, the repeated element from which cross-connect switches are constructed is a switch module, not a switch point. Hence, if one is to minimize the cost of the cross-connect switch, the cross-connect switch design must obtain the maximum economics of scale in constructing the switch modules as well as minimizing the total number of switch points in the cross-connect switch. The prior art designs have employed relatively large switch modules. For example, the cross-connect switch taught by Bergeron, Jr., et al. employs a large switch module having 64 input and 64 output lines. If large switch modules are used, the number of such switch modules in a cross-connect switch will be too small to obtain the full economies of scale. In addition, the number of switch points needed to implement the cross-connect switch is much greater than would be needed if a smaller switch module had been chosen.

Broadly, it is an object of the present invention to provide an improved cross-connect switch which is adapted for automating the functions currently provided by the main distribution frame in a telephone system.

It is a further object of the present invention to provide a cross-connect switch which may be constructed from one or two repeated switch modules.

It is another object of the present invention to provide a cross-connect switch which requires the minimum number of switch points to construct.

These and other objects of the present invention will become obvious to those skilled in the art from the following detailed description of the invention and the accompanying drawings.

SUMMARY OF THE INVENTION

The present invention consists of a cross-connect switch for connecting any of $N_{in}$ input lines to any of $N_{out}$ output lines. The switch comprises $2S+1$ stages labeled, $-S$ to $S$. The center stage thereof is labeled O. Each stage i, for i different from O, comprises a plurality of $^in \times ^in$ switch modules and stage O comprises a plurlity of $^On_{in} \times ^On_{out}$ switch modules wherein $^On_{in}$ is not equal to $^On_{out}$. Each said switch module comprises a means for connecting any given input line thereto to any given output line therefrom provided the input and output lines in question are idle.

The switch modules are connected such that, for $s=-S$ to $S-1$, each output line of each switch module in stage s is coupled to an input line of a switch module in stage $s+1$. Each switch module in stage s is coupled to at least two different switch modules in stage $s+1$, and each switch module in stage $s+1$ is coupled to a switch module in stage s.

Each input line to the cross-connect switch is coupled to a corresponding input line of a switch module in stage $-S$. And, each output line from said cross-connect switch is coupled to a corresponding output line of a switch module in stage S.

BRIEF DESCRIPTION OF THE DRAWINGS

FIG. 10 illustrates the manner in which two switch modules may be combined to form a larger switch module.

DETAILED DESCRIPTION OF THE INVENTION

Figure 1:
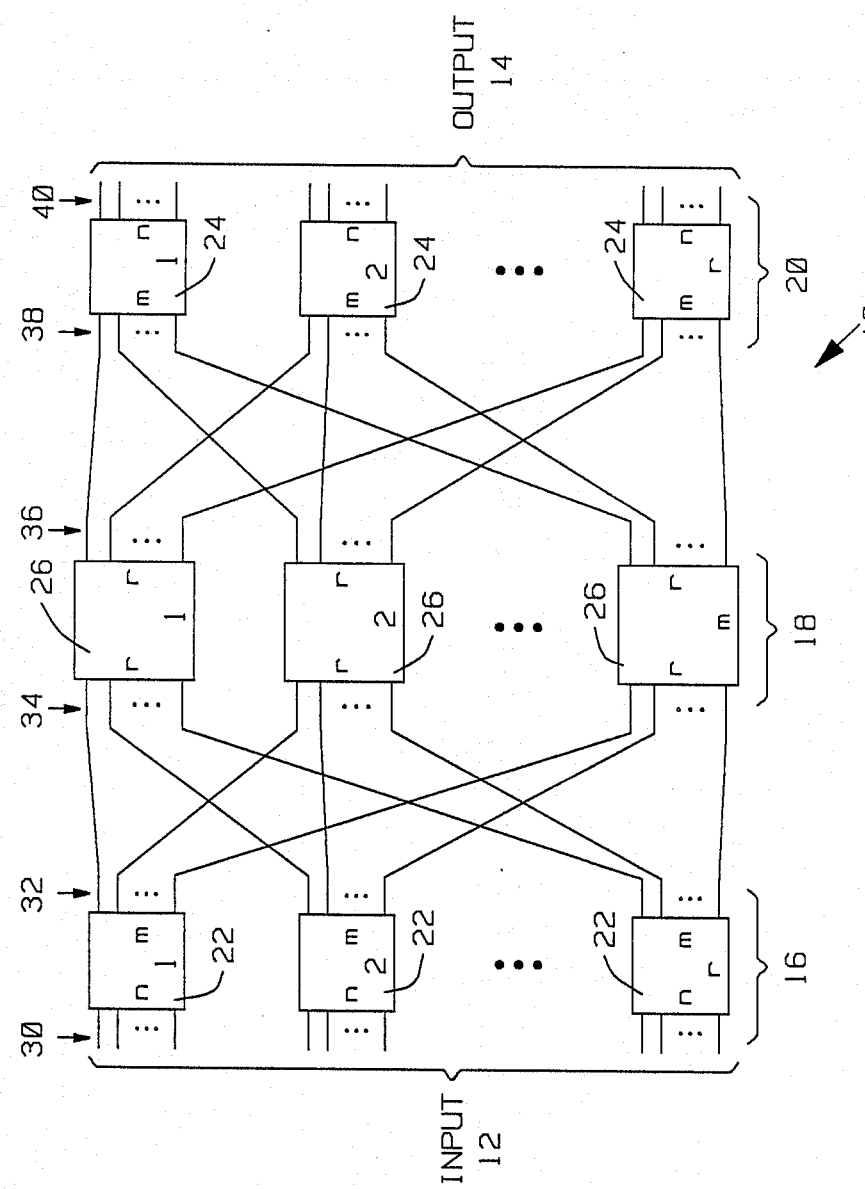
FIG. 1 is a block diagram of a prior art cross-connect switch.

The advantages of the present invention can be most easily understood with reference to a conventional cross-connect switch of the type taught by Clos (Bell Systems Technical Journal, 32, pages 406–424, 1953). A cross-connect switch as taught by Clos is shown in FIG. 1 at 10. Switch 10 connects an input line 12 to an output line 14 provided the pair of lines in question are currently idle. That is, the lines in question are not currently connected to other input or output lines. Switch 10 consists of three stages, an input stage 16, an output stage 20, and a center stage 18. Input stage 16 is constructed from a plurality of input switch modules 22. There are "r" input switch modules 22 in switch 10. Each input switch module provides a means for connecting an input line 30 to an output line 32, provided the input and output lines in question are idle. In the general case, there are n input lines 30 and m output lines 32 associated with each input switch module 22. Input lines 32 also form the input lines 12 of switch 10.

Similarly, the output stage 20 consists of a plurality of output switch modules 24, each output switch module providing a means for connecting an input line 36 to an output line 40 provided the lines in question are idle. There are also r output switch modules 24 in switch 10. Each output module 24 includes m input lines 38 and n output lines 40. Output lines 40 also form the output lines 14 of switch 10.

Finally, the center stage 18 consists of m center switch modules 26. Each center switch module has "r" input lines 34 and r output lines 36. Each center stage switch module 26 provides a means for connecting an input line 34 to an output line 36 provided the pair of lines in question is idle. Each input line 34 of any given center stage switch module is connected to a corresponding output line 32 in each input switch module 22. Similarly, each output line 36 of any given center stage switch module is connected to a corresponding input line 38 in each output switch module 24.

A connection from a given input 12 to a given output 14 is made by using the input stage module 22 to which the input in question is connected to connect the input line to one of the center stage switch modules 26. The center stage switch module in question is then used to connect the line to the output switch module 24 which includes the output line in question. These connections are made by sending appropriate signals to each of the switch modules in question. For clarity, the signal inputs which are used to control the input switch modules 22, the output switch modules 24, and the center stage switch modules 26 have been omitted from FIG. 1.

Figure 2:
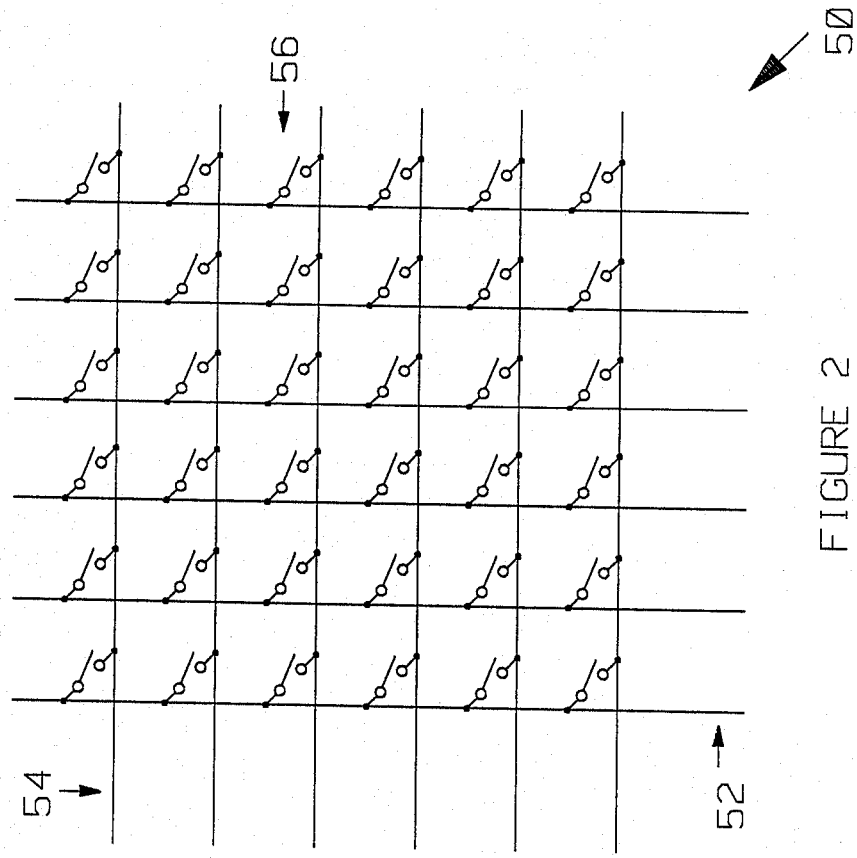
FIG. 2 illustrates one of the switch modules shown in FIG. 1.

Each of the switch modules 22, 24, and 26 is constructed from a plurality of switch points as shown in FIG. 2 at 50. Switch module 50 illustrates a switch module for connecting any of six input lines 54 to any of 6 output lines 52. Switch module 50 consists of 36 switches 56. Each switch connects a specific input line 54 to a specific output line 52. As noted above, the switch points are typically controlled by external signals from a host computer which receives instructions specifying the desired connections.

Referring again to FIG. 1, switch 10 is shown as consisting of three stages. However, it is to be understood that each center stage switch module 26 may itself be a three stage switch. Hence, switch 10 can represent a switch having any number of stages provided the number is odd.

To simplify the following discussion, a switch module for connecting any of N input lines to any of M output lines will be referred to as an N×M switch module. Such a switch module may be constructed from an array of switch points such as shown in FIG. 2. Alternatively, the switch module may be constructed from a plurality of smaller switch modules which are connected as a cross-connect switch.

Cross-connect switches of the Clos design are potentially very useful in telecommunication systems such as automating the functions of main distribution frames. For telecommunications purposes cross-connect switches must be non-blocking. That is, any idle input line 12 must be able to be connected to any idle output line without interrupting a connection between any other input and output lines. Clos has shown that a switch will be non-blocking if the number of center stage switch modules is greater than or equal to $2n-1$, where n is the number of input lines to each input stage switch module and the number of output lines from each output stage switch module. Slepian (Two Theorems on a Particular Crossbar Switching Network, unpulished manuscript, 1952, results reproduced in MATHEMATICAL THEORY OF CONNECTING NETWORKS AND TELEPHONE TRAFFIC, V. E. Benes, Academic Press, New York, N.Y.) has shown that a switch having the configuration of switch 10 will be non-blocking if the number of output lines, m, associated with each input and output switch module is greater than or equal to the number of input lines, r, in each center stage switch module 26. In order to make such a connection in a Slepian switch, it may be necessary to rearrange existing connections in the switch. Algorithms for making such rearrangements have been described by Paull (Bell Systems Technical Journal, 41, pages 833-855, 1962).

The cost of a cross-connect switch of the type shown in FIG. 1 is related, among other things, to the number of switch points needed to implement the various switching modules used to construct the cross-connect switch. Benes (Bell Systems Technical Journal), 43, pages 1641-1656, 1964) analyzed the configuration of a cross-connect switch according to the Clos design to determine the configuration which would minimize the number of switch points for any given number of input lines. In the approach taught by Benes, one constructs a switch according to the teaching of Slepian which has N input lines and N output lines. The switch in question has $2S+1$ stages. Each stage is constructed from switch modules having equal numbers of input and output lines, the number of such lines being determined by N. An understanding of the Benes design for a cross-connect switch is essential to understanding the present invention; hence, the Benes design will be discussed in detail before discussing the differences between the present invention and that taught by Benes.

To construct a cross-connect switch according to Benes with $N>6$, one first selects the size of the switch modules used to construct the center stage. If P is largest prime factor of N, then number of input (and output) lines, $N_c$, for each center stage switch module is chosen to be P if $P>3$. If $P=3$ and N is even, $N_c$ is chosen to be 6. If $P=3$ and N is odd, $N_c$ is chosen to be 3. Finally, if $P=2$ then $N_c$ is chosen to be 4.

If N is less than or equal to 6, a single N×N switch module is used to construct the cross-connect switch.

Having chosen $N_c$, one then decomposes $N/N_c$ into its prime factors, $f_i$. The number of prime factors determines the number of stages in the cross-connect switch. In particular, if there are S prime factors, the cross-connect switch will have $2S+1$ stages. The cross-connect switch is symmetric about the center stage which will be labeled as stage O. The stages on the output side of the center stage will be labeled with positive numbers, and the stages on the input side of the center stage will be labeled with negative numbers. Hence, stage i and stage $-i$ are both constructed from $f_i \times f_i$ switch modules.

Figure 3:
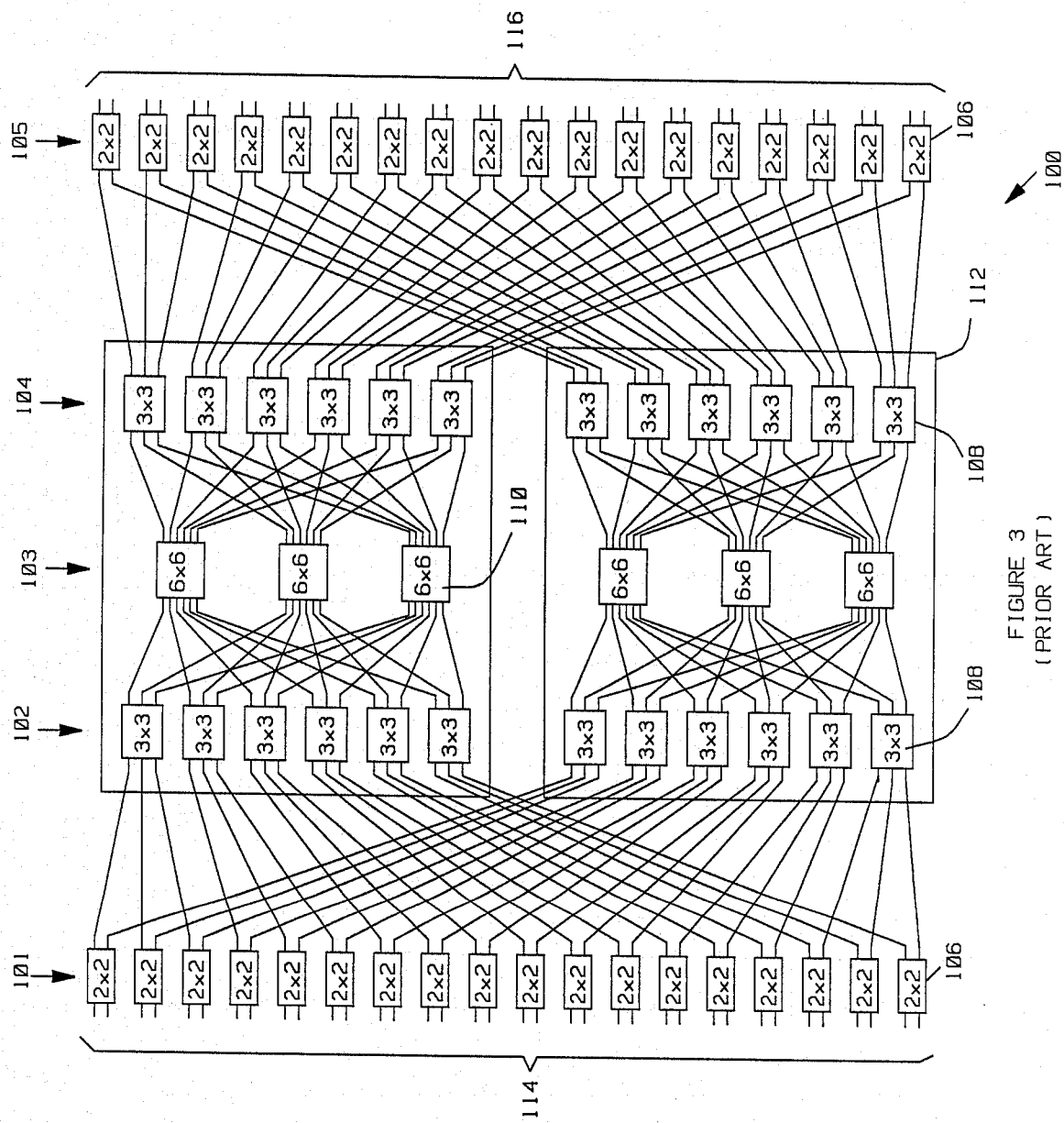
FIG. 3 is a block diagram of a prior art 36×36 cross-connect switch.

This methodology can be more easily understood with reference to the specific cross-connect switch shown in FIG. 3 at 100. Switch 100 is a 36×36 cross-connect switch. That is, it has 36 input lines 114 and 36 output lines 116. Since the largest prime factor of 36 is 3 and, since N=36 is even, $N_c=6$. That is, the center stage 103 of switch 100 is to be constructed from 6×6 switch modules 110. $N/N_c$ is, therefore, equal to 6 which has prime factors of 2 and 3. Since there 2 prime factors, the switch will have 5 stages. The five stages are shown at 101 through 105 in FIG. 3. The first stage 101 and the fifth stage 105 are constructed from 18 2×2 switch modules 106. The second stage 102 and the fourth stage 104 are constructed 3×3 switch modules 108.

Although switch 100 has five stages, it may be viewed as a three-stage Clos switch in which the center stage is constructed from two 18×18 switch modules 112. Each switch module 112 is in turn a three stage switch having a first and third stages constructed from 3×3 switch modules and a center stage constructed from 6×6 switch modules.

Figure 4:
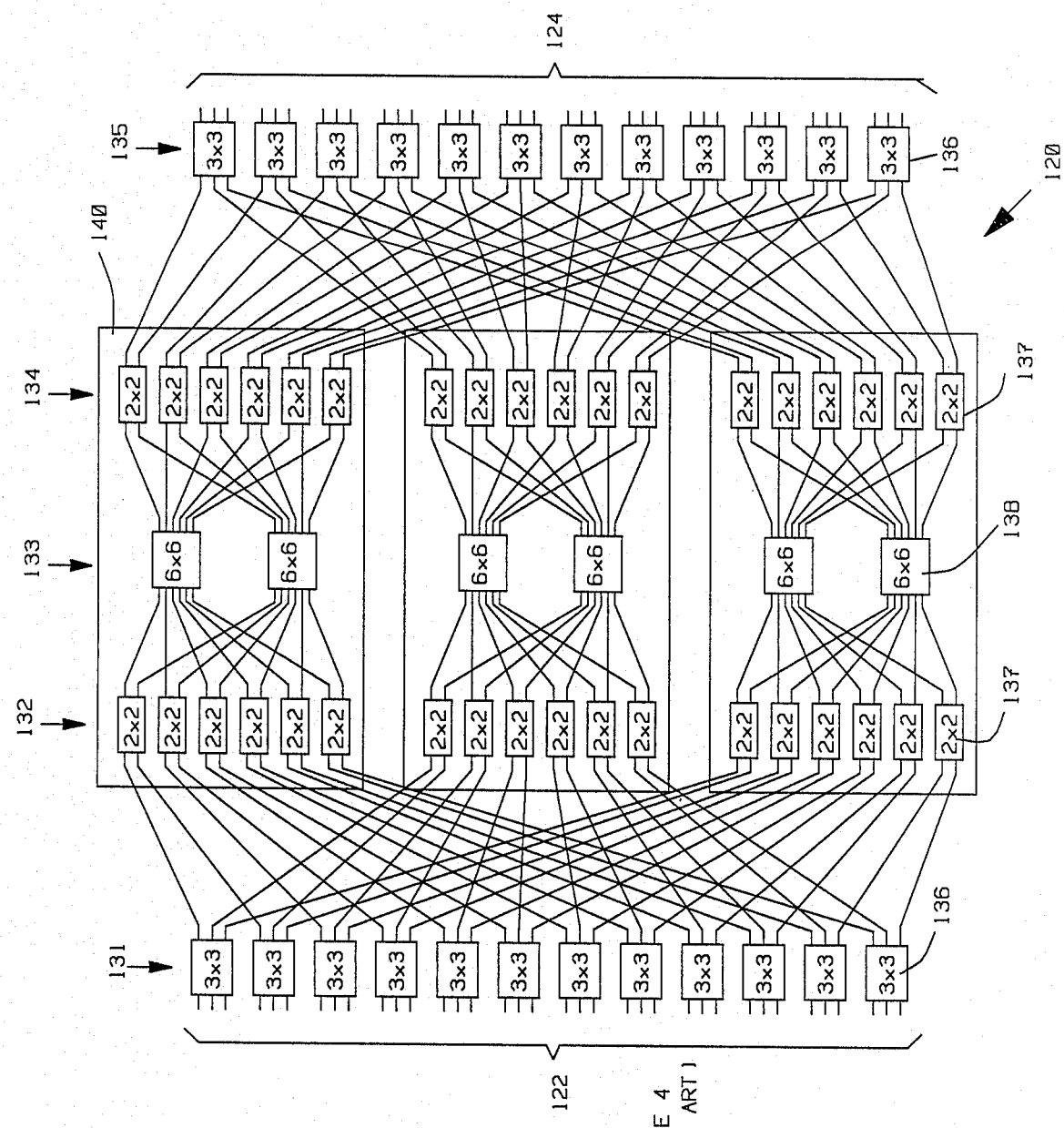
FIG. 4 is a block diagram of an alternative embodiment of the 36×36 cross-connect switch illustrated in FIG. 3.

The choice of which switch modules are used for the stages other than the center stage does not affect the total number of cross-points needed to construct a switch according to Benes. For example, an alternative 36×36 cross-connect switch could be constructed in which the first and fifth stages are constructed from 3×3 switch modules and the second and fourth stages are constructed from 2×2 switch modules. Such a switch is shown in FIG. 4 at 120.

Switch 120 has five stages 131 through 135. The center stage 133 is constructed from 6×6 switch modules of which switch module 138 is typical. The first stage 131 and the fifth stage 135 are constructed from 3×3 switch modules of which switch modules 136 are typical. The second stage 132 and fourth stage 134 are constructed from 2×2 switch modules of which switch modules 137 are typical. Switch 120 may also be viewed as a three stage switch in which the center stage consists of three 12×12 switch modules of which switch module 140 is typical.

In this type of switch design, the sizes of the switch modules used in the various stages and the total number of input lines determine the organization of the switch. If the kth stage is constructed from n×n switch modules, the number of switch modules in that stage is N/n, where N is the total number of input and output lines to the switch.

If the switch contains more than three stages, it is organized as a "three stage switch" in which the center stage is constructed from a plurality of switch modules which are themselves three stage switches. Each of these three stage switch modules may also be constructed from a plurality of switch modules which are three stage switches, and so on. Consider a five stage switch having $N_c \times N_c$ switch modules in the center stage, $f_1 \times f_1$ switch modules in the first and fifth stages, and $f_2 \times f_2$ switch modules in the second and fourth stages. Each three stage switch module has an input stage, and output stage, and a center stage. The inner most three stage switch module has $f_i$ $N_c \times N_c$ switch modules as its center stage and $N_c$ $f_i \times f_i$ switch modules as its input and output stages. The five stage switch is constructed as a three stage Clos switch having a center stage consisting of $f_1$ $n \times n$ switches, where $n = n_c f_2$ The input and output stages of this five stage switch contain n $f_1 \times f_1$ switch modules. It will be apparent to those skilled in the art that this process can be iteratively applied to construct a switch having an arbitrarily large number of stages, provided said number is odd.

Although the Benes design provides a cross-connect switch having the minimum number of cross-points for a given number of input and output lines, N, this design suffers from three problems. First, it is often true that a switch having more than N lines actually has fewer cross-points. For example, a $60 \times 60$ switch according to Benes requires 720 cross-points. The switch in question has 7 stages. The center stage is constructed from $5 \times 5$ switch modules. Two of the remaining stages are constructed from $3 \times 3$ switch modules, and the remaining 4 stages are constructed from $2 \times 2$ switch modules.

However, a $64 \times 64$ switch according to Benes requires only 512 cross-points. This switch has 9 stages. The center stage is constructed from $4 \times 4$ switch modules, and the remaining stages are constructed from $2 \times 2$ switch modules. Hence, it is more economical, in terms of the number of cross-points, to use a $64 \times 64$ switch and merely ignore four of the input and output lines.

Second, the Benes design does not take into account the costs of using several different switch modules. As pointed out above, it is important to minimize the number of different switch modules needed to construct a cross-connect switch, since significant economies of scale may be obtained if only one or two different types of switch modules are needed to construct the cross-connect switch. A large cross-connect switch according to the teachings of Benes often requires several different switch modules. For example, a $210 \times 210$ cross-connect switch requires four different switch modules, $7 \times 7$, $5 \times 5$, $3 \times 3$, and $2 \times 2$, and requires a total of 5670 cross-points. A $218 \times 218$ cross-connect switch can be constructed using only $6 \times 6$ switch modules and requires only about 15% more cross-points. This small increase in the number of cross-points may be more than offset by the decrease in the cost of the $6 \times 6$ switch module relative to producing smaller numbers of the above four different switch modules. In addition, the cost of maintaining spare parts is also reduced. Hence, a cross-connect switch which is less "optimum" than that described by Benes may, in fact, be more economical to produce.

Finally, the Benes design only applies to cross-connect switches having equal numbers of input and output lines. Neither Benes nor Slepian teach the construction of a rearrangeable cross-connect switch in which the number of input lines, $N_{in}$ differs from the number of output lines, $N_{out}$. As pointed out above, there are a number of applications in which it is advantageous to have a cross-connect switch in which $N_{in}$ differs significantly from $N_{out}$, e.g., cross-connect switches for automating the functions of a main distribution frame in a telephone central office. Prior art cross-connect switches for automating the main distribution frame function have been constructed as cross-connect switches in which the $N_{in}$ was equal to $N_{out}$. This leads to significant increases in the cost of the cross-connect switch.

For example, suppose that the desired number of input lines, $N_{in}$, is one half the number of output lines, $N_{out}$. In prior art systems, a $N_{out} \times N_{out}$ cross-connect switch was constructed. The excess input lines were not connected. This results in the inclusion of a large number of cross-points which are never used which is clearly undesirable.

The present invention avoids these problems. A block diagram of a three stage cross-connect switch according to the present invention is shown at 70 in FIG. 5. Cross-connect switch 70 connects any of $N_{in}$ input lines 72 to any of $N_{out}$ output lines 74 provided the pair of lines in question is idle. Cross-connect switch 70 includes an input stage 76, a center stage 78, and an output stage 80.

The input stage 76 includes $K_i$ input switch modules 82, each said switch module having $n_i$ input lines 84 and m output lines 86. Each input switch module 82 provides a means for connecting any of its input lines to any of its output lines provided the pair of lines in question is idle. Input switch module 82 preferably consists of an array of switch points similar to that shown in FIG. 2 at 50 which are under the control of a host computer. For clarity, the connections to the host computer have been omitted from the figures. However, it is to be understood that each switch module is connected to a device which specifies the connections made in said switch module. The number of output lines, m, is preferably equal to the number of input lines, $n_i$. However, as long as m is greater than or equal to $n_i$ and $n_o$, cross-connect switch 70 will be non-blocking.

The output stage 80 includes $K_o$ output switch modules 88, each output switch module 88 having m input lines 90 and $n_o$ output lines 92. Each output switch module 88 provides a means for connecting any of its input lines to any of its output lines provided the pair of lines in question is idle. Output switch module 88 preferably consists of an array of switch points similar to that shown in FIG. 2 at 50. The number of input lines, m, is preferably equal to the number of output lines, $n_o$. However, as long as m is greater than or equal to $n_o$ and $n_i$, cross-connect switch 70 will be non-blocking.

The center stage 78 includes m center stage switch modules 94, each said module having $K_i$ input lines 96 and $K_o$ output lines 98. Each center switch module 94 provides a means for connecting any of its input lines to any of its output lines provided the lines in question are idle. Each input line 96 of a center stage switch module 94 is connected to one output line 86 of an input switch module 82. Hence, each input switch module 82 provides a means for connecting any of its input lines 84 to an input line 96 of any of the center stage switch modules 94. Similarly, each center stage switch module output line 98 is connect to one input line 90 of an output switch module 88 so as to provide a means for establishing a connection between the center stage switch module in question and any of the output switch modules 88.

Cross-connect switch 70 differs from a cross-connect switch as taught in the prior art in that the center stage is constructed from switch modules which have different numbers of input and output lines, i.e., $K_i$ is not equal to $K_o$. As a result, cross-connect switches in which the number of input lines differs from the number of output lines may be constructed. For the purposes of the following discussion, it will be assumed that $K_o$ is greater than $K_i$. It will be apparent to those skilled in the art that if a particular application required a switch having more input lines than output lines, one would merely interchange the "input" and "output" labels in the following discussion.

Figure 5:
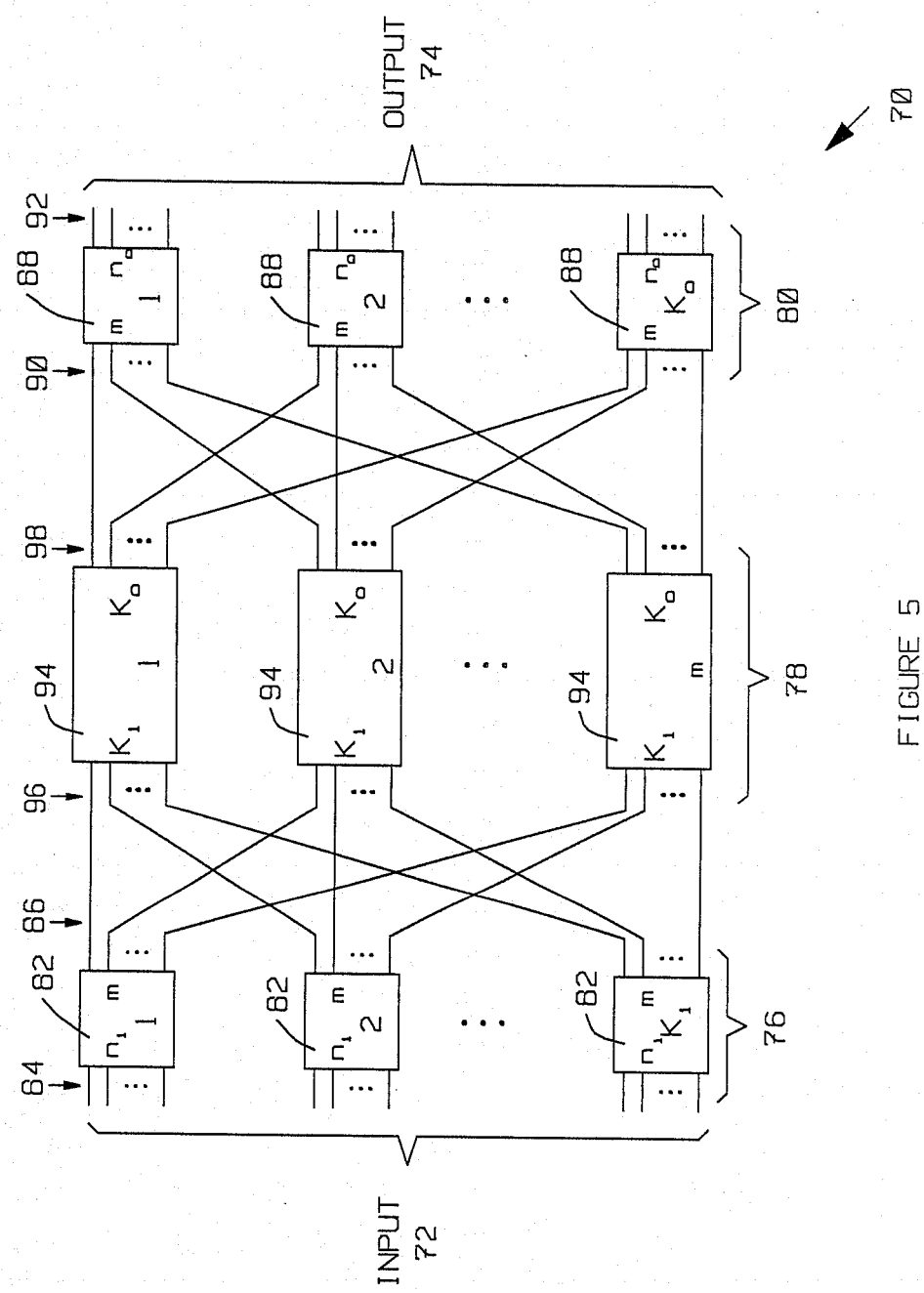
FIG. 5 is a block diagram of a cross-connect switch according to the present invention.

It will be apparent from FIG. 5 that the number of switch modules 88, $K_o$, in the output stage 80 is equal to the smallest integer which is greater than or equal to $N_{out}/n_o$, where $N_{out}$ is the number of output lines 74. Similarly, the number of switch modules 82, $K_i$, in the input stage 76 is equal to the smallest integer which is greater than or equal to $N_{in}/n_i$, where $N_{in}$ is the number of input lines 72.

It will also be apparent to those skilled in the art that each of the center stage switch modules 94 may be an array of switch points such as shown in FIG. 2 or said switch module may itself be a three stage cross-connect switch according to the present invention. Hence, the present invention may be used to construct a cross-connect switch having any number of stages, provided the number of stages is odd.

A cross-connect switch according to the present invention having 5 or more stages is preferably constructed in a manner analogous to that described above with reference to the method of Benes. For the purposes of this discussion, it will be assumed that the cross-connect switch is to connect $N_{in}$ input lines to $N_{out}$ output lines where $N_{out}$ is greater than $N_{in}$. It will also be assumed that $N_{out}$ is greater than 6. If $N_{out}$ is less than or equal to 6 a single $N_{in} \times N_{out}$ switch module is preferred.

The first step in constructing a cross-connect switch is to determine the size of the center modules and the number of stages. The center stage switch modules will have $^0n_{in}$ input lines and $^0n_{out}$ output lines. The number of output lines is determined as follows. Let P be the largest prime factor of $N_{out}$. Then $^0n_{out}$ is P if P is greater than 3. If P is 3 and $N_{out}$ is even, $^0n_{out}$ is 6. If P is 3 and $N_{out}$ is odd, $^0n_{out}$ is 3. Finally, if P is 2, $^0n_{out}=4$. The number of input lines, $^0n_{in}$, is set equal to the smallest integer which is greater than or equal to $^0n_{out}/F$, where $F=N_{out}/N_{in}$.

Once the center stage switch module size has been determined, the number of stages and the size of the switch modules used to construct each of the other stages is determined as follows. Let $f_i$ be the prime factors of $N_{out}/^0n_{out}$, i.e., $$N_{out}/^0n_{out} = \prod_{i=1}^{S} f_i.$$

If there are S such factors, the cross-connect switch will have $2S+1$ stages. These stages will be labeled from $-S$ to S, the center stage being stage O. Stages i and $-i$ will be constructed from switch modules having $f_i$ input lines and $f_i$ output lines. The number of switch modules in the $i^{th}$ stage will be $N_{out}/f_i$ for stages O through S. For stages $-1$ through $-S$, the number of switch modules in the $i^{th}$ stage will be greater than or equal to the smallest integer which is greater than or equal to $N_{in}/f_i$.

The switch modules in the $i^{th}$ stage are connected to the switch modules in the $(i+1)^{th}$ stage in a manner analogous to that described with reference to prior art cross-connect switches as described by Slepian. Each output line of a switch module in the $i^{th}$ stage is connected to different switch module in the $(i+1)^{th}$ stage through an input line thereof. If there are more than 3 stages, the switch modules in the inner stages are grouped into larger switch modules, so that the switch is topologically a three stage switch in which the center stage is constructed from switch modules which are themselves three stage switches.

Figure 6:
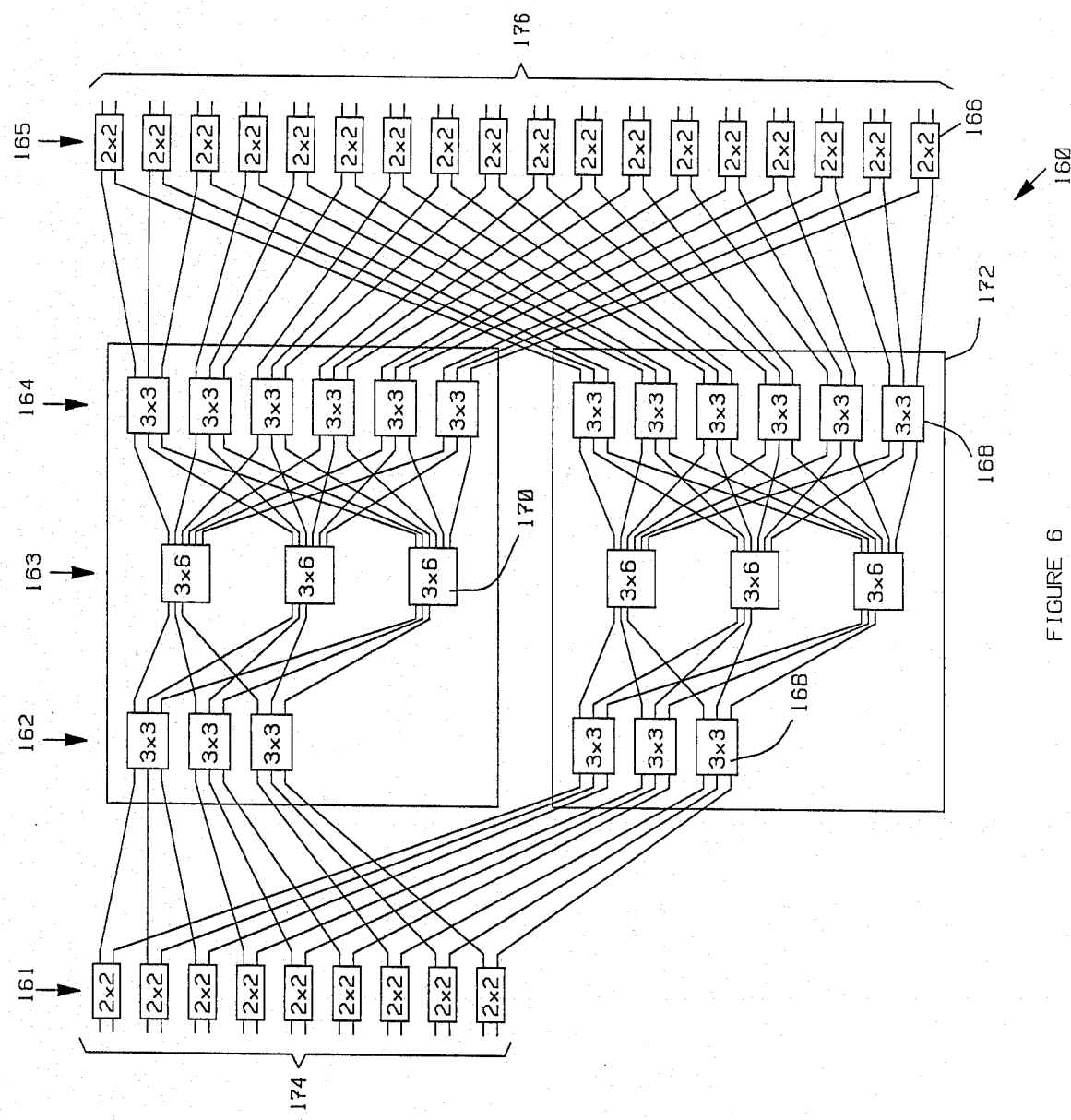
FIG. 6 is a block diagram of an 18×36 cross-connect switch according to the present invention.
Figure 7:
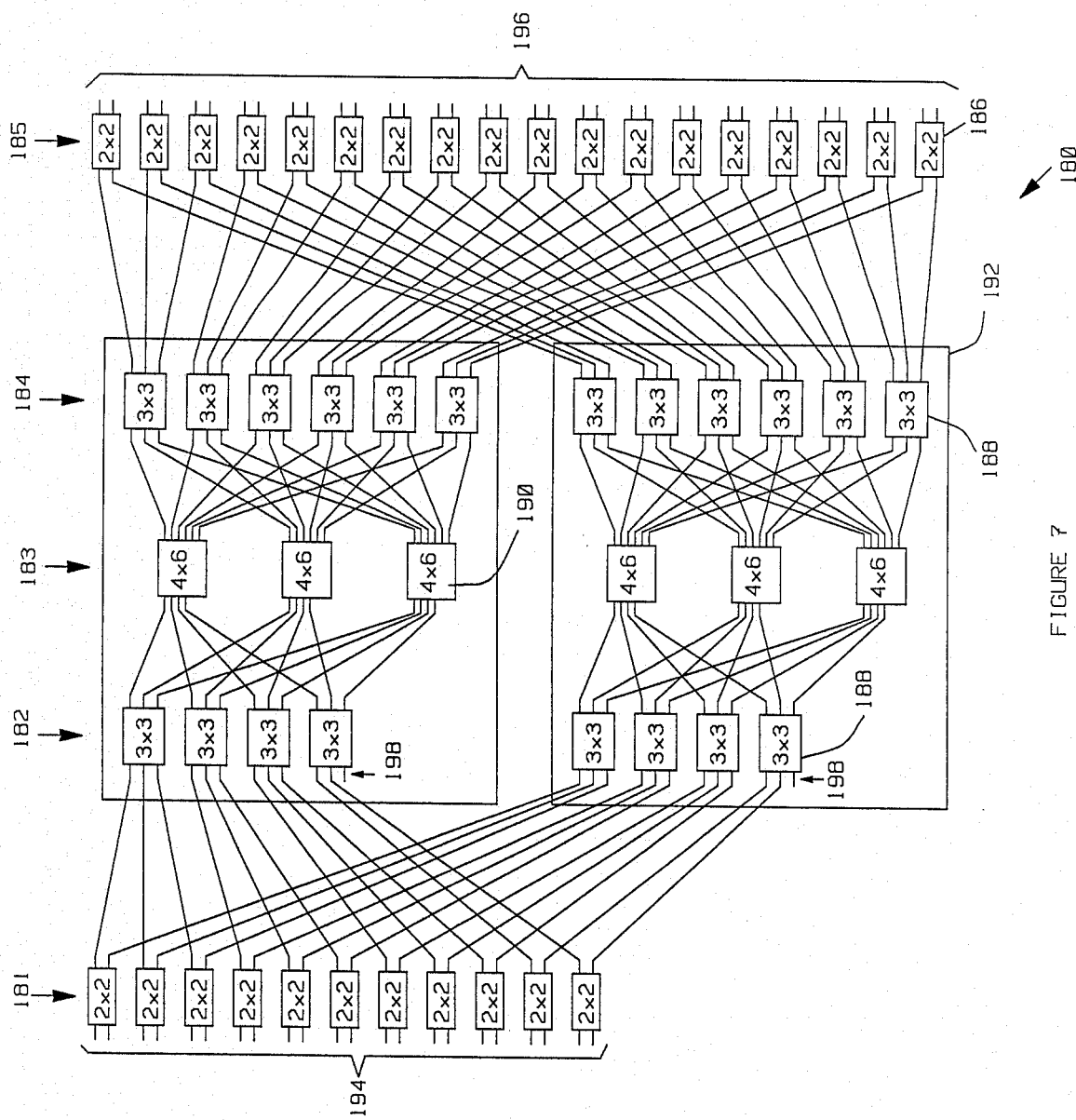
FIG. 7 is a block diagram of a 22×36 cross-connect switch according to the present invention.

FIGS. 6 and 7 illustrate two cross-connect switches according to the present invention. FIG. 6 is a block diagram of a cross-connect switch 160 having 18 input lines 174 and 36 output lines 176. Since the largest prime factor of 36 is 3 and 36 is an even number, the center stage of cross-connect switch 160 is constructed from switch modules 170 having 6 output lines. Cross-connect switch 160 has twice as many output lines as input lines; hence, each switch module 170 has 3 input lines. As described above, the number of stages in cross-connect switch 160 is determined by factoring $N_{out}/^0n_{out}$ into its prime factors. In this case, $$N_{out}/^0n_{out}=6=(3)(2).$$

Hence, cross-connect switch 160 has five stages, 161 through 165. Stages 161 and 165 are constructed from switch modules 166 having 2 input lines and 2 output lines, and stages 162 and 164 are constructed from switch modules 168 having 3 input lines and 3 output lines.

The center stage switch modules are grouped together. Three center stage switch modules are connected such that each switch module is connected to 6 switch modules in stage 164 and 3 switch modules in stage 162. These center stage switch modules and the switch modules in stages 162 and 164 to which they are connected can be viewed as a single three stage switch module 172 having 9 input lines and 18 output lines. Cross-connect switch 160 may then be viewed as a three stage switch having a center stage constructed from two switch modules having 9 input lines and 18 output lines.

Referring now to FIG. 7 which is a block diagram of a cross-connect switch 180 for connecting 22 input lines 194 to 36 output lines 196. Since, cross-connect switch 180 has the same number of output lines as cross-connect switch 160 described above, cross-connect switch 180 will also have 5 stages, 181 through 185, with the center stage constructed switch modules 190 having 6 output lines. Stages 181 and 185 are constructed from $2 \times 2$ switch modules 186, and stages 182 and 184 are constructed from $3 \times 3$ switch modules 188. However, in this case, the number of input lines will be 4, i.e., the smallest integer greater than or equal to $6 \times 22/36$.

Since the number of output lines 196 is not a multiple of the number of input lines, at least some of the switch modules will include inputs which are not used. These are shown at 198 in FIG. 7. In general, assume that the $i^{th}$ stage of the cross-connect switch is constructed from switch modules having $^in_{out}$ output lines and $^in_{in}$ input lines. From this example, it is clear that each switch module in stage i will be connected to $^in_{out}$ switch modules in stage i+1; however, each switch module in stage i+1 is not necessarily connected to $^{i+1}n_{in}$ switch modules in stage i. A switch module in a stage on the input side of the center stage may be connected to as few as one switch module in the preceding stage.

Once again, it should be noted that cross-connect switch 180 may be regarded as a three stage switch in which the center stage is constructed from switch modules 192 which are themselves three stage switches.

Figure 8:
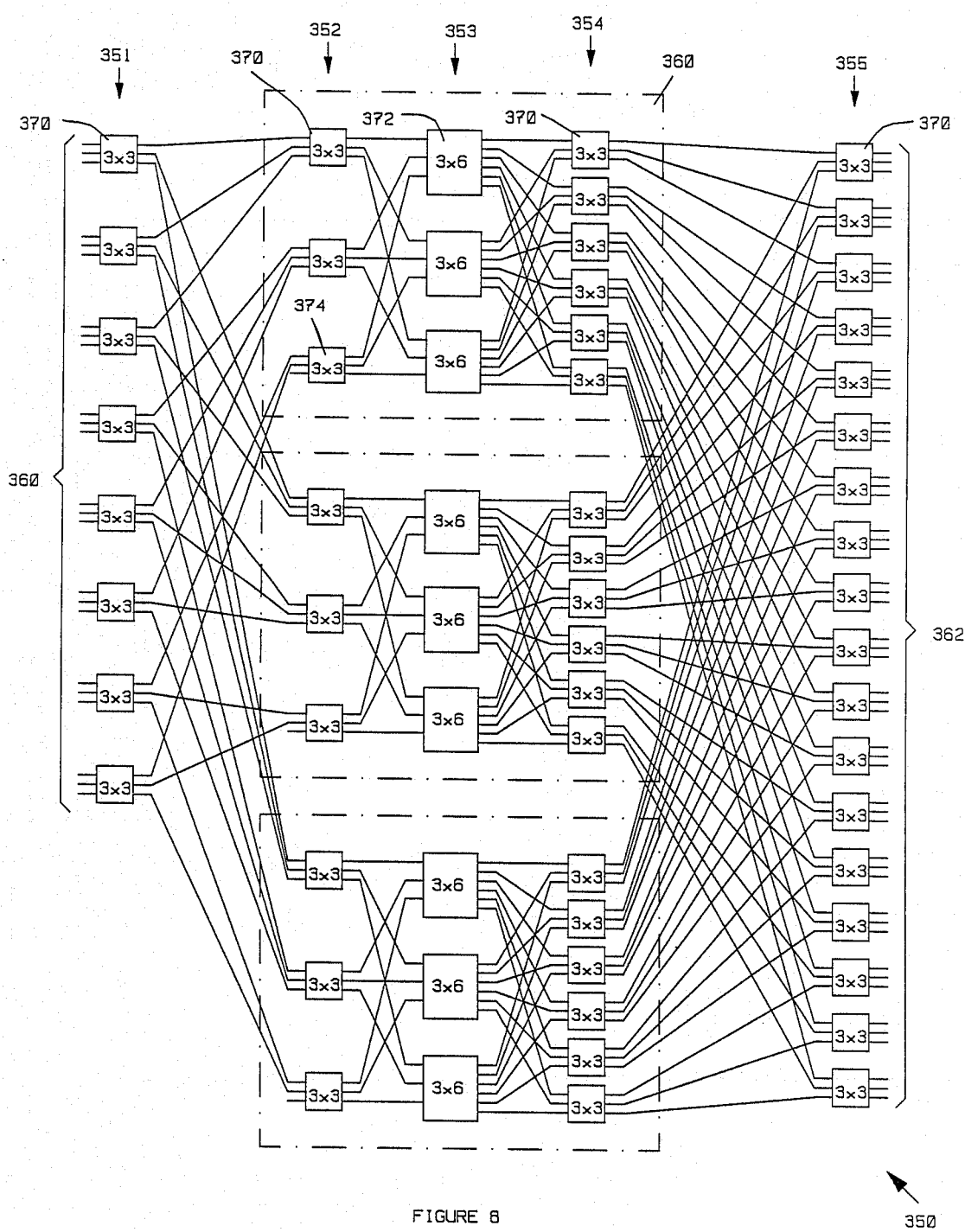
FIG. 8 is a block diagram of a 24×54 cross-connect switch according to the present invention.

As noted above, the number of switch modules in the $i^{th}$ stage for stages $-1$ through $-S$ is greater than or equal M, where M is the smallest integer which is greater than or equal to $N_{in}/f_i$. In the above cases, the number of such stages is equal to M. The cases in which this number is greater than M, can most easily be understood with reference to the 24×54 cross-connect switch illustrated in FIG. 8 at 350. Cross-connect switch 350 connects any of the 24 input lines 360 to any of the 54 output lines 362 provided the pair of lines in question are idle. Cross-connect switch 350 is constructed from five stages, 351 through 355. The center stage 353 is constructed from 3×6 switch modules 372. The remaining stages are constructed from 3×3 switch modules 370.

Cross-connect switch 350 must also be topologically a three stage switch. The center state of the equivalent three stage switch is constructed from 8×18 switch modules 360. To construct three 8×18 switch modules using the switch modules in stages 352 through 354, stage 352 must contain at 9 3×3 switch modules, since three such modules are needed for each 8×18 switch module.

It is the need to maintain this type of three stage topology that sometimes requires the addition of additional switch modules in a stage. For example, stage 352 requires 9 3×3 modules 270. However, $N_{in}/f_{-1}$ is only 8. Hence, one additional module is needed to maintain the three stage topology. As a result of the addition of this extra module, one input line in one of the 3×3 modules which make up the input stage of each 8×18 switch modules 360 is not used. The 3×3 switch module in question is shown at 374 in FIG. 8.

As pointed out above the Benes design provides a cross-connect switch having the minimum number of cross-points for a given equal number of input and output lines, N, and it is often found that a switch having more than N lines actually has fewer cross-points. This problem would also be present in a cross-connect switch according to the present invention, since the output side of such a cross-connect switch is identical to a cross-connect switch according to Benes. This problem may be avoided if the number of output lines in the cross-connect switch is adjusted before construction the cross-connect switch using the rules described above.

Let C(M) be the number of cross-points needed to construct a cross-connect switch according to Benes having M output lines and M input lines. If one wishes to construct a cross-connect switch according to the present invention which has N output lines, one first finds that value of M which is greater than or equal to N and for which C(M) is minimum. One then constructs a cross-connect switch according to the present invention having $N_{out}$ equal to the value of M so determined. It will be apparent to those skilled in the art that $$C(M) = M \sum_{i=-S}^{S} n_i,$$

where $n_i$ is number of input and output lines in each switch module in the $i^{th}$ stage. Here, the values of $n_i$ are determined as described above with reference to cross-connect switch as taught by Benes. It will be apparent to those skilled in the art that the value of M which minimizes C(M) may be found using conventional computer searching methods. That is, one computes C(M) for all values of M from the N to some upper limit and then selects the value of M for which C(M) was minimum. In general, the value of M which minimizes C(M) will lie between N and $2^k$, where k is the largest integer for which N is greater than or equal to $2^{k-1}$.

Figures 11, 12:
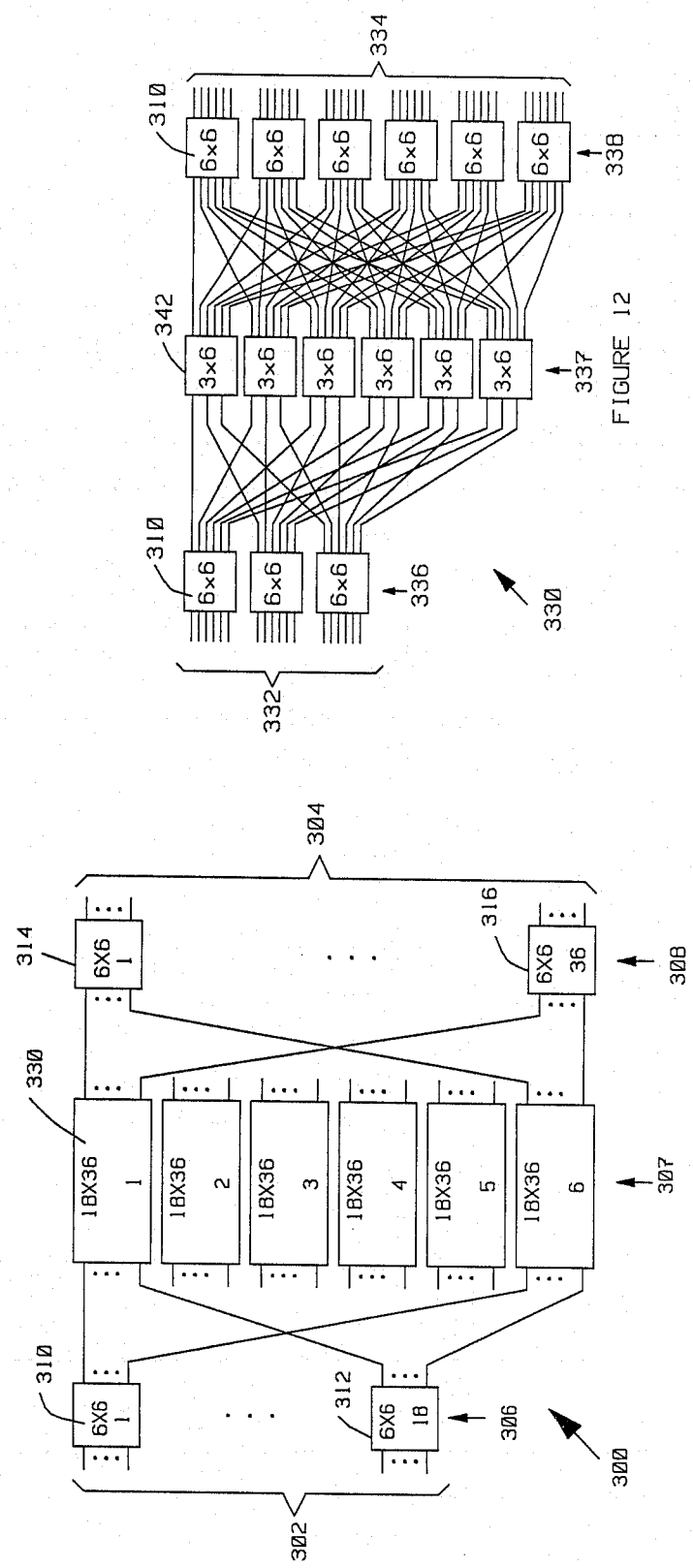
FIG. 11 is a block diagram of a 108×216 cross-connect switch according to the present invention.
FIG. 12 is a block diagram of one of the center stage switch modules of the cross-connect switch shown in FIG. 10.

As pointed out above, the cost of a cross-connect switch is also affected by other design considerations such as the number of different types of switch modules which must be used to construct the switch. The above described embodiment of the present invention minimizes the number cross points. In those cases in which it is more desirable to minimize the number of different types of switch modules, the embodiment of the present invention illustrated in FIGS. 9 through 11 is preferred.

Figure 9:
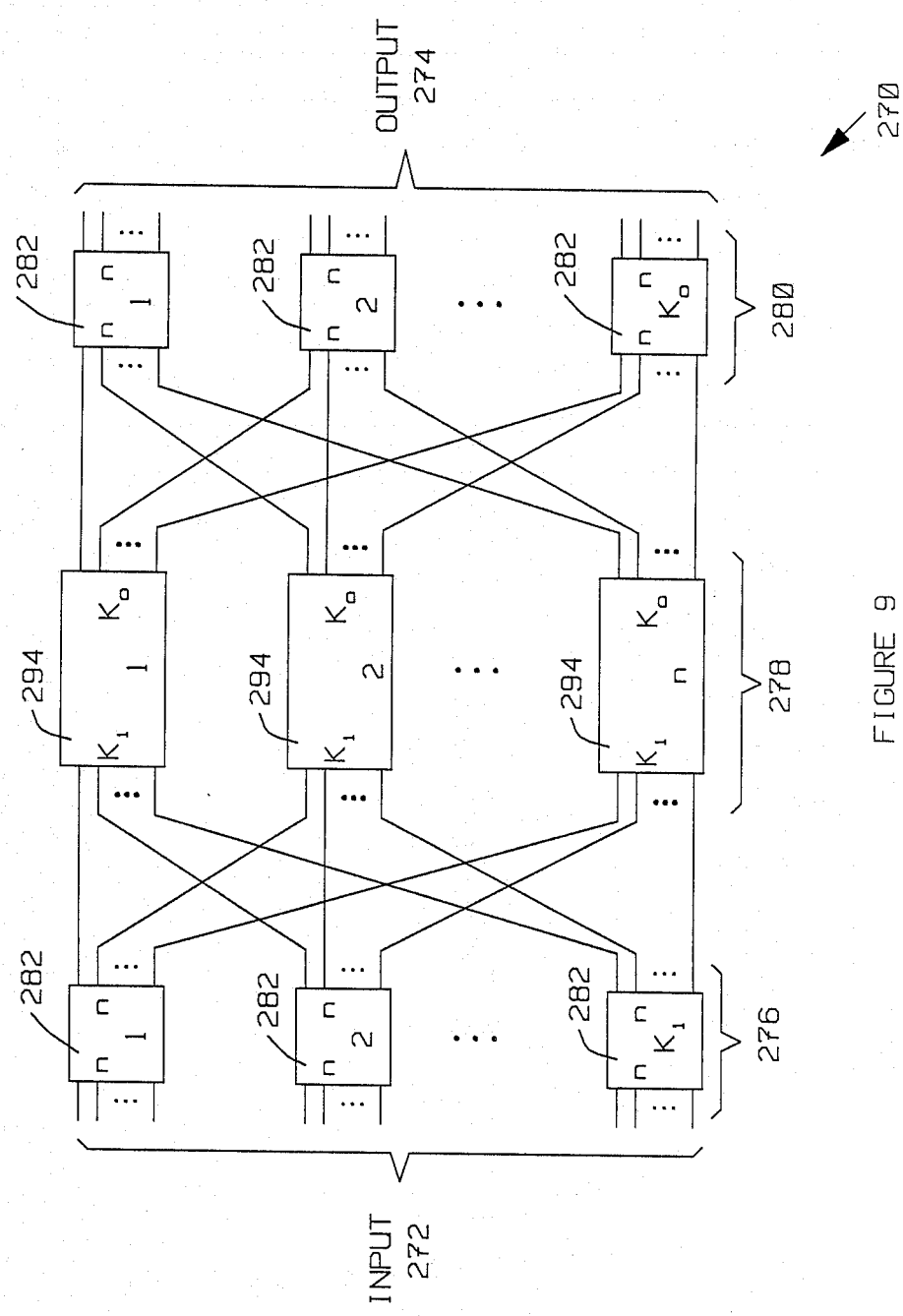
FIG. 9 is a block diagram of a cross-connect switch according to the present invention in which, at most, two types of switch modules are needed.

FIG. 9 is a block diagram of a three stage cross-connect switch 270 constructed according to the present invention. Cross-connect switch 270 connects any of a plurality of input line 272 to any of a plurality of output lines 274 provided the pair of lines in question is idle. Cross-connect switch 270 is similar to cross-connect switch 70 shown in FIG. 5 in that it consists of input, center, and output stages, 276 through 278, respectively. Each stage consists of a plurality of switch modules. Each switch module provides a means for connecting an input line to that switch module to an output line of said switch module provided the pair of lines in question are idle.

Cross-connect switch 270 differs from cross-connect switch 70 in that the number of input and output lines of the switch modules in the various stages are restricted to values which permit Cross-connect switch 270 to be constructed from at most two different switch module types. The input stage 276 and output stage 280 are constructed from switch modules 282 having equal numbers of input and output lines. The number of such input and output lines will be referred to as "n" in the following discussion.

The center stage 278 therefore consists of n switch modules 294 having $K_i$ input lines and $K_o$ output lines. In the preferred embodiment, $K_o$ is equal to n and $K_i$ is an integer which is greater than 1. Here, $K_o$ is chosen to be a multiple of $K_i$. If these conditions are met, then cross-connect switch 270 may be constructed from a single type of switch module having 1 input lines and n output lines. Here, the center stage switch modules each consist of one of these 1×n switch modules. The switch modules 282 in the input and output stages are constructed from (n/1) 1×n switch modules.

FIG. 10 illustrates the manner in which two 3×6 switch modules 210 and 220 may be combined to form a single switch module 200 having 6 input lines 202 and six output lines 204. Each of the 3×6 switch modules has three input lines shown at 212 and 222 and six output lines shown at 214 and 224. Each output line of switch module 214 is connected to the corresponding output line of switch module 214. These six output lines then become the six output lines of switch module 200 which are shown at 204. The three input lines 222 of switch module 220 become the first three input lines of switch module 200 which are labeled "1" through "3", and the three input lines 212 of switch module 210 become the remaining three input lines of switch module 200. These lines are labeled "4" through "6" in FIG. 10.

From the above example, it will be apparent to one skilled in the art that an n×n switch module can be constructed by connecting a plurality of 1×n switch modules together provided n is a multiple of 1. Here, each output line of each 1×n switch module is connected to the corresponding output line in the other 1×n switch modules, and each input line of each of the 1×n switch modules is assigned as one of the input lines of the n×n switch module.

Referring again to FIG. 9, it will also be apparent to one skilled in the art that cross-connect switch 270 shown in FIG. 9 may be used as a center stage switch module in a larger cross-connect switch having input and output stages which are also constructed from n×n switch modules. This provides a means for constructing a cross-connect switch having any arbitrarily large number of stages, provided the number of stages is odd and the number of output lines is a power of n, ie., $N_{out}=n^k$ where k is an integer.

FIGS. 11 and 12 are block diagrams of a five stage switch constructed in this manner. Cross-connect switch 300 may be used to connect any of 108 input lines 302 to any of 216 output lines 308. Cross-connect switch 300 is constructed from an input stage 306, an output stage 308, and a center stage 307. The input and output stages are constructed from a plurality of switch modules 310. Each switch module 310 provides a means for connecting any of six input lines to any of six output lines provided the pair of lines in question is idle. The input stage 306 has 18 such switch modules, and the output stage 308 has 36 such switch modules.

The center stage 307 includes six switch modules 330. Each switch module 330 provides a means for connecting any of 18 input lines to any of 36 output lines provided the pair of lines in question is idle. Each switch module 330 is itself a three stage cross-connect switch. A block diagram of switch module 330 is shown in FIG. 12. Switch module 330 consists of an input stage 336, an output stage 338, and a center stage 337. The input and output stages are constructed from switch modules 310 which are the same as the switch modules shown at 310 in FIG. 11 which are used to construct the input and output of cross-connect switch 300. Three switch modules 310 are used to construct the input stage 336 and six switch modules 310 are used to construct the output stage 338.

The center stage 337 of switch module 330 is constructed from 6 switch modules 342. Each switch module 342 provides a means for connecting any of three input lines to any of six output lines. As noted above with reference to FIG. 10, two switch modules 342 may be connected together to form a switch module 310. Hence cross-connect switch 300 may be constructed from a single type of switch module, namely switch module 342. This allows for significant economies of scale; however, it increases the number of cross-points needed relative to the embodiments of the present invention discussed with reference to FIGS. 5 through 7.

For example, a cross-connect switch for connecting 108 input lines to 216 output lines constructed in the manner taught with reference to FIGS. 5 through 7 would consist of 7 stages. The center most stage would be constructed from 3×6 switch modules, two of the outer stages would be constructed from 3×3 switch modules, and the remaining 2 outer stages would be constructed from 2×2 switch modules. This switch would require a total of 3888 cross-points to construct. Cross-connect switch 300 shown in FIGS. 11 and 12 requires a total of 4536 cross-points to construct. That is, the increased economies of scale provided by the design shown in FIGS. 11 and 12 results in an increase the number of cross-points by about 14%. It is often found that this increase in cross-points is more than offset by cost savings resulting from the increased economies of scale, particularly when only one type of switch module is needed to construct the entire cross-connect switch.

Although the present invention has been described in terms of a cross-connect switch for automating a main distribution frame, it will be apparent to one of ordinary skill in the art that the present invention is also applicable to a wide range of additional cross-connect problems. For example, it may be used to provide cross-connect functions in area remote from the central office servicing the subscribers in the area in question.

There has been described herein a novel cross-connect switch. Various modifications to the present invention will become apparent to those skilled in the art from the foregoing description and accompanying drawings. Accordingly, the present invention is to be limited solely by the scope of the following claims.

What is claimed is:

1. A rearrangeable, non-blocking cross-connect switch adapted to couple each of a plurality of cross-connect switch input lines to a respective one of a plurality of cross-connect switch output lines for connecting a pair of idle lines comprising one said switch input line and one said switch output line without breaking the connections between other connected pairs of input and output lines, said cross-connect switch comprising input, output, and center stages, said input stage comprising a plurality of input switch modules, each said switch module having a plurality of input lines and a plurality of output lines, each said input switch module including means for connecting any pair of idle lines comprising one said input line and one said output line without breaking the connections between other input and output lines, each of said cross-connect switch input lines being connected to a corresponding one of said input lines of said input switch modules, said output stage comprising a plurality of output switch modules, each said output switch module including a plurality of input lines, a plurality of output lines, and means for connecting any pair of idle lines comprising one said input line and one said output line without breaking the connections between other input and output lines, each of said cross-connect switch output lines being connected to a corresponding one of said output lines of said output switch modules, and said center stage comprising a plurality of center stage switch modules, each said center switch module including a plurality output lines, a plurality of input lines, and means for connecting any pair of idle lines comprising one said input line and one said output line without breaking the connections between other input and output lines, each of said input lines of said center switch module being coupled to a corresponding output line of an input switch module such that each said center switch module is connected to each input switch module and each said input switch module is connected to each said center switch module, each of said output lines of said center switch modules being coupled to a corresponding input line of an output switch module such that each said center switch module is connected to each said output switch module and each said output switch module is connected to each said center switch module, wherein the number of input lines in each of said center switch modules is not equal to the number of output lines in said center switch module, wherein the number of input lines in each said input switch module is equal to the number of output lines in said input switch module and wherein the number of input lines in each said output switch module is equal to the number of output lines in said output switch module.

2. The cross-connect switch of claim 1 wherein each of said input and output switch modules comprises a plurality of center switch modules connected such that each output line of each said center switch module is connected in common to the corresponding output line of each of the other center switch modules to form one output line of said input or output switch module and each input line of a said center switch module forms one of the input lines of said input or output switch module.

3. A rearrangeable, non-blocking cross-connect switch adapted to couple each of a plurality of cross-connect switch input lines to a respective one of a plurality of cross-connect switch output lines for connecting a pair of idle lines comprising one said switch input line and one said switch output line without breaking the connections between other connected pairs of input and output lines, said cross-connect switch comprising input, output, and center stages, said input stage comprising a plurality of input switch modules, each said switch module having a plurality of input lines and a plurality of output lines, each said input switch module including means for connecting any pair of idle lines comprising one said input line and one said output line without breaking the connections between other input and output lines, each of said cross-connect switch input lines being connected to a corresponding one of said input lines of said input switch modules, said output stage comprising a plurality of output switch modules, each said output switch module including a plurality of input lines, a plurality of output lines, and means for connecting any pair of idle lines comprising one said input line and one said output line without breaking the connections between other input and output lines, each of said cross-connect switch output lines being connected to a corresponding one of said output lines of said output switch modules, and said center stage comprising a plurality of center stage switch modules, each said center switch module including a plurality output lines, a plurality of input lines, and means for connecting any pair of idle lines comprising one said input line and one said output line without breaking the connections between other input and output lines, each of said input lines of said center switch module being coupled to a corresponding output line of an input switch module such that each said center switch module is connected to each input switch module and each said input switch module is connected to each said center switch module, each of said output lines of said center switch modules being coupled to a corresponding input line of an output switch module such that each said center switch module is connected to each said output switch module and each said output switch module is connected to each said center switch module, wherein the number of input lines in each of said center switch modules is not equal to the number of output lines in said center switch module, wherein the number of input lines in each said input switch module is equal to the number of output lines in said input switch module, wherein the number of input lines in each said output switch module is equal to the number of output lines in said output switch module, and wherein the number of cross-connect output lines is $N_{out}$, wherein $N_{out} > 6$ and the number of output lines in each said center switch module is equal to the largest prime factor of $N_{out}$ if said prime factor is greater than 3, to 3 if said prime factor is 3 and $N_{out}$ is odd, to 6 if said prime factor is 3 and $N_{out}$ is even, and to 4 if said prime factor is 2.

4. The cross-connect switch of claim 3 wherein the number of input and output lines in each said output switch module and each said input switch module is a factor of $N_{out}$ divided by the number of output lines in a said center switch module.

5. The cross-connect switch of claim 4 wherein said factor is a prime number.

6. The cross-connect switch of claim 4 wherein the number of cross-connect switch input lines is $N_{in}$, wherein the number of input lines in said center switch modules is equal to the smallest integer which is greater than or equal to $(N_{in}/N_{out})$ times the number of output lines in said center switch modules.

7. A rearrangeable, non-blocking cross-connect switch for connecting any of $N_{in}$ input lines to any of $N_{out}$ output lines, said switch comprising $2S+1$ stages labeled, $-S$ to $S$, wherein the center stage thereof is labeled O and wherein stage i, for i different from O, comprises a plurality of $^i n \times ^i n$ switch modules and stage O comprises a plurality of $^0 n_{in} \times ^0 n_{out}$ switch modules wherein $^0 n_{in}$ is not equal to $^0 n_{out}$, each said switch module comprising means for connecting any given input line thereto to any given output line therefrom provided the input and output lines in question are idle, wherein for $s = -S$ to $S-1$, each output line of each switch module in stage s is coupled to an input line of a switch module in stage $s+1$ such that each switch module in stage s is coupled to at least two different switch modules in stage $s+1$ and each switch module in stage $s+1$ is coupled to a switch module in stage s, each input line to said cross-connect switch being coupled to a corresponding input line of a switch module in stage $-S$, and each output line from said cross-connect switch being coupled to a corresponding output line of a switch module in stage S.

8. The cross-connect switch of claim 7 wherein $^i n$ is equal to $^{-i} n$ for i equal to 1 through S.

9. The cross-connect switch of claim 8 wherein $^0 n_{in}$ is equal to the smallest integer which is greater than or equal to $N_{in}/N_{out}$ times $^0 n_{out}$.

10. The cross-connect switch of claim 9 wherein $$N_{out} = {}^0n_{out} \prod_{i=1}^{S} {}^in.$$

11. The cross-connect switch of claim 10 wherein $N_{out} > 6$ and ${}^0n_{out}$ is largest prime factor of $N_{out}$ if said prime factor is greater than 3, ${}^0n_{out}$ is equal to 3 if said prime factor is 3 and $N_{out}$ is odd, ${}^0n_{out}$ is equal to 6 if said prime factor is 3 and $N_{out}$ is even, and ${}^0n_{out}$ is 4 if said prime factor is 2.

12. The cross-connect switch of claim 11 wherein the ${}^in$ are prime numbers for i equal to 1 through S.

13. The cross-connect switch of claim 12 wherein each switch module in stages with i different from 0 comprises a plurality of ${}^0n_{in} \times {}^0n_{out}$ switch modules connected such that each output line of each said ${}^0n_{in} \times {}^0n_{out}$ switch module is connected to the corresponding output line of each of the other ${}^0n_{in} \times {}^0n_{out}$ switch modules, each input line of a said ${}^0n_{in} \times {}^0n_{out}$ switch module forming one of the input lines of said switch modules.

* * * * *